US006636042B1

(12) United States Patent
Dorren

(10) Patent No.: US 6,636,042 B1
(45) Date of Patent: Oct. 21, 2003

(54) UNDER AND ABOVE GROUND, RADIO FREQUENCY DRIVEN ELEMENT, VECTOR DISPLAY, METAL LOCATING SYSTEM

(75) Inventor: Louis Dorren, Millbrae, CA (US)

(73) Assignee: Geometrics Group, Inc., San Jose, CA (US)

(*) Notice: Subject to any disclaimer, the term of this patent is extended or adjusted under 35 U.S.C. 154(b) by 0 days.

(21) Appl. No.: 09/948,519

(22) Filed: Sep. 7, 2001

Related U.S. Application Data

(60) Provisional application No. 60/230,848, filed on Sep. 7, 2000, now Pat. No. 6,541,976.

(51) Int. Cl.[7] .................... G01V 3/08; G01V 3/165
(52) U.S. Cl. .................................. 324/326; 324/67
(58) Field of Search .................. 324/326, 329, 324/334–337, 345, 67, 528–530; 342/22, 417–419, 443, 459; 455/41

(56) References Cited

U.S. PATENT DOCUMENTS

| | | | | |
|---|---|---|---|---|
| 4,021,725 A | * | 5/1977 | Kirkland | 324/326 |
| 4,146,894 A | * | 3/1979 | Barton | 342/418 |
| 4,161,686 A | * | 7/1979 | Weber | 324/67 X |
| 4,263,552 A | * | 4/1981 | Weber | 324/326 |
| 4,551,727 A | * | 11/1985 | Cunningham | 342/418 |
| 5,321,361 A | * | 6/1994 | Goodman | 324/326 |
| 5,657,026 A | * | 8/1997 | Culpepper et al. | 342/418 X |
| 5,754,049 A | * | 5/1998 | Howell | 324/326 |
| 6,107,801 A | * | 8/2000 | Hopwood et al. | 324/326 |
| 6,211,807 B1 | * | 4/2001 | Wilkison | 342/22 |
| 6,407,550 B1 | * | 6/2002 | Parakulam et al. | 324/326 |

* cited by examiner

Primary Examiner—Gerard R. Strecker
(74) Attorney, Agent, or Firm—Beyer Weaver & Thomas, LLP

(57) ABSTRACT

A system for locating underground or above ground metal and pipe objects includes a transmitter for generating an RF signal which is applied to the object which acts as a transmitter. An above-ground antenna array receives the RF signal transmitted by the underground object with a commutator for periodically and sequentially receiving signal from each antenna in the array, the commutator frequency modulating the received signal. A FM demodulator then demodulates the signal from the commutator and provides a Doppler effect frequency shift signal. A vector positional display then indicates position of the object based on the Doppler effect frequency shift signal relative to a reference signal.

15 Claims, 8 Drawing Sheets

UNDER AND ABOVE GROUND, RADIO FREQUENCY DRIVEN ELEMENT, VECTOR DISPLAY, METAL LOCATING SYSTEM

CROSS-REFERENCES TO RELATED APPLICATIONS

This patent application claims the benefit of Provisional Application No. 60/230,848 filed Sep. 7, 2000 and is related to application Ser. No. 09/734,963, filed Dec. 11, 2000 now U.S. Pat. No. 6,541,976.

BACKGROUND OF THE INVENTION

This invention relates generally to metal detection apparatus, and more particularly the invention relates to a system which detects signals emitted from a metal object such as an underground pipe.

In the construction and utility maintenance fields, the ability to trace underground metal and underground piping has been needed, for both safety and maintenance purposes. Commonly available equipment to do this job uses very low frequency systems for detection and tracing.

The ability to detect and trace underground piping is greatly affected by the environment that exists at the time of detection. If the ground is very wet or is made of different combinations of earth, erroneous results may occur. If the underground pipe or metal contains an insulating gasket, this may limit the distance at which the pipe can be traced due to the gasket acting like a very low value capacitor. This capacitor is a high impedance to the very low frequency signals, thus preventing them from jumping across the gasket. In addition, the ability to couple the low frequency energy to the underground metal or pipe becomes very difficult. The extreme low frequency makes necessary a very high voltage for the pipe to emit enough signal to be detected.

Display systems for construction utility maintenance tracing equipment are generally single point displays. This means that they can accurately indicate the position of a single pipe or piece of metal. In co-pending application Ser. No. 09/734,963, supra, the technique of time of arrival or phase differential detection is used. In this system, the phase difference between two arrival signals is measured to give positional information to a single point detector. A single point detector is defined as a device that indicates a peak or null when over the single target. Multiple targets can give erroneous readings.

The present invention is directed to a metal locating system which will accurately show the position of multiple targets simultaneously. The system can be used over a wide frequency range, from the very low frequencies to ultra high frequencies.

BRIEF SUMMARY OF THE INVENTION

The present invention includes a transmitter section for applying an RF signal to a metal or underground pipe which then acts as a transmitter, and a receiver section including a sequentially activated antenna array with each antenna of the array capable of detecting the transmitted signal. The antenna array effectively frequency modulates the detected signal depending on orientation of the object from the array.

More particularly, the transmitter section comprises a radio frequency oscillator and a radio frequency power amplifier. The output of the radio frequency power amplifier is connected to an impedance matching network. This network is used to turn the pipe or metal being driven into a loss line transmission radiator.

The receiver section of the invention comprises an array of signal sensors or antenna elements. This array can be any number of elements in size. For explanation purposes, 4 and 8 element arrays are used. The signal sensor elements are selected by an electronic sensor selection switch. The output of this switch feeds an FM receiver. The output of the FM receiver feeds a lowpass filter and a high Q bandpass filter. These can be switched capacitor filters and their clock frequencies are synchronized with the signal sensor selection clock. The output of the bandpass filter feeds a negative slope zero crossing detector. A zero crossing corresponds to an antenna pair parallel to and coplanar with the radiating pipe. A negative slope zero crossing detector outputs a pulse on each negative going zero crossing at its input. The output of the negative slope zero crossing detector feeds an adjustable delay line. The adjustable delay line corrects timing errors in the system. The output of the delay line feeds the vector display unit. A master clock generator synchronizes all circuits and provides a reference clock for the vector display unit.

The signal sensor elements must all be the same type. A four element signal sensor array consists of identical sensor elements placed at the end of a symmetrical cross. The eight element signal sensor array has 8 identical sensor elements placed in a circular fashion. The sensor elements for either array are selected in by an electronic switch. The action of the switch is the equivalent to mechanically rotating a single sensor element. The output from the signal sensor selector switch feeds an FM receiver. The output of the FM receiver is a series of audio pulses, each one corresponding to a sensor element of the signal sensor array during electronic selection. The output signal is fed to a filter system which converts the pulses to an analog signal and cleans the signal before being then applied to the high Q bandpass filter. The high Q bandpass filter has a clock signal that is synchronized to the switching control signal of the signal sensor array electronic switch. This synchronization provides consistent data to the negative slope zero crossing detector. The negative slope zero crossing detector accurately detects the frequency shift of the signal caused by the Doppler shift in the signal sensor array. This is done by measuring the shift in the negative slope zero crossing detector against the reference clock signal of the clock system. To synchronize the timing and make up for delays in the system, an adjustable delay line is inserted between the output of the negative slope zero crossing detector and the vector display unit. This delay line allows the positional calibration of the vector display unit. Each light of the vector display corresponds to a positional vector and to a detected zero crossing.

When the signal sensor array is to the left of the target pipe, the vector display indicates how far to the left the signal sensor is. As the signal sensor array is moved over the target, the position of the target on the display will change with the position of the array over the target and the position of the detected zero crossing. If the target pipe is a branch, both sections of the branch will appear on the vector display. As previously stated, the commutation of the electronic sensor switch is equivalent to physically rotating a single signal sensor element at high-speed. The Doppler effect of this rotation is the detected frequency at the output of the FM receiver. The zero crossing of the detected frequency at the output of the negative slope zero crossing detector, accurately defines the position of the target. This information is displayed on the vector unit.

The invention and objects and features thereof will be more readily apparent from the following description and appended claims when taken with the drawings.

DETAILED DESCRIPTION OF THE INVENTION

Figure 1:
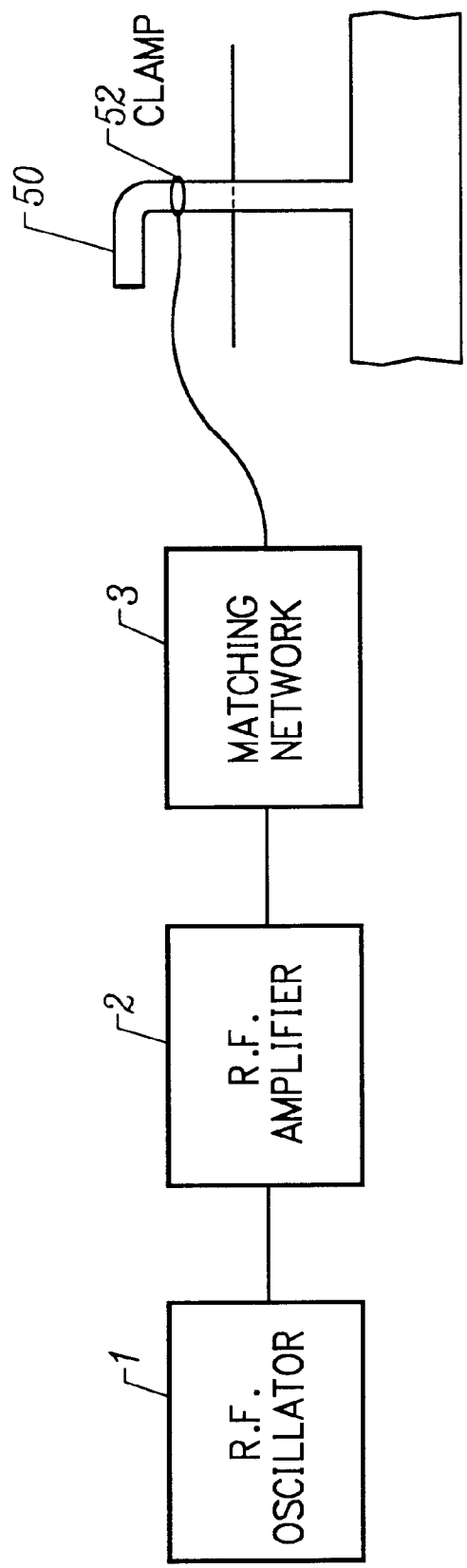
FIG. 1 is a block diagram of unit 1, the transmitter with a connection to the illustrated underground pipe.

The invention comprises two units operating at radio frequencies. It should be obvious to anyone skilled within the art, that frequencies from the very low to the ultra high frequency range can be used (10 kilohertz to 1 GHz). FIG. 1 is a block diagram of unit one (transmitter) of the system. The transmitter consisting of the RF oscillator 1 and the RF amplifier 2 can be the transmitter disclosed in co-pending application 09/734,963, supra. The output of RF oscillator 1 feeds the input of the RF amplifier 2. The output of RF amplifier 2 feeds the matching network 3. The matching network is used to maximize the power transfer between the RF amplifier 2 and the metal or pipe 50 through clamp 52.

Figure 2:
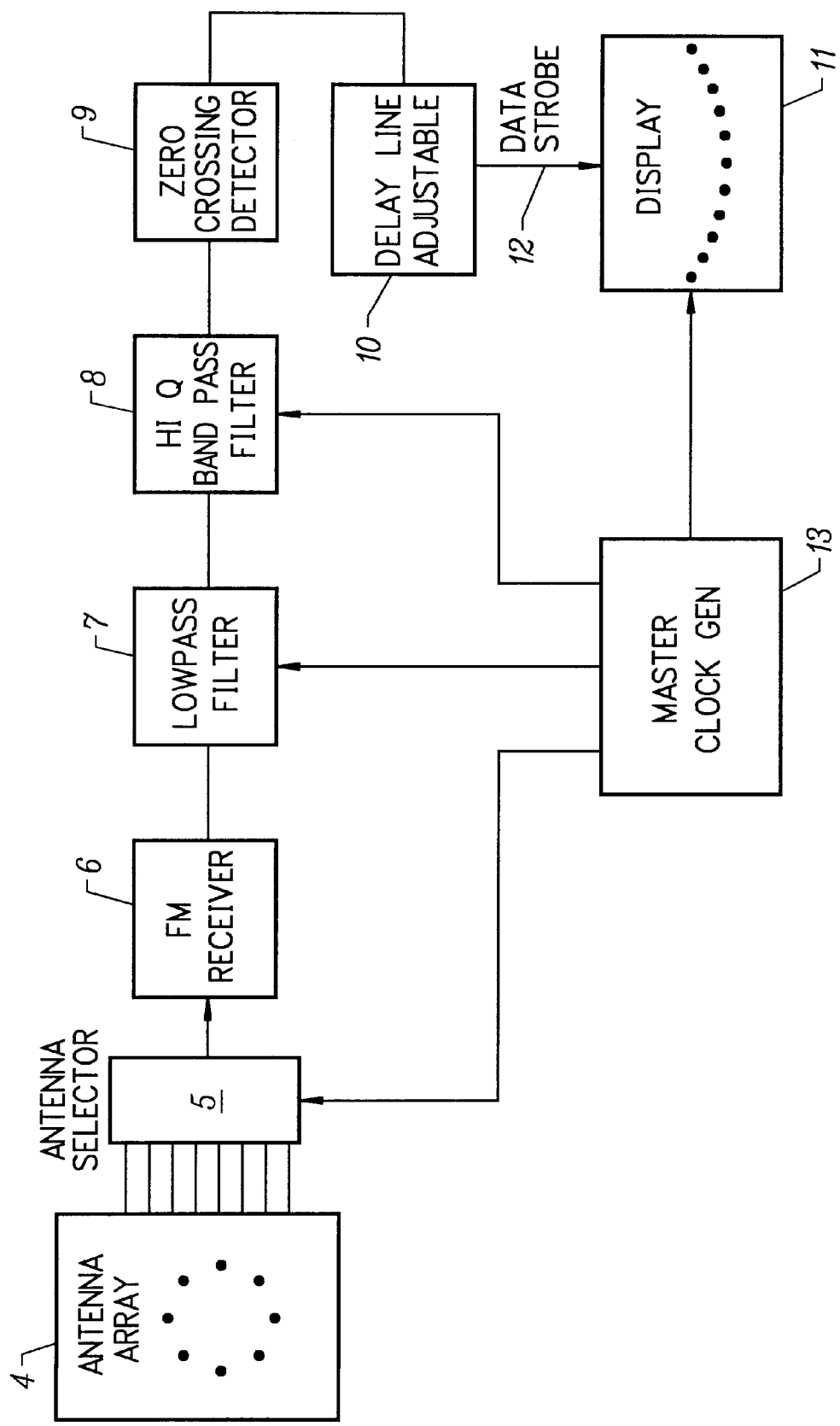
FIG. 2 is a block diagram of the vector receiver.

FIG. 2 is the block diagram of unit two of the system. The signal sensor array 4 is connected into the signal sensor selector switch 5. The output of the signal sensor selector switch 5 feeds the FM receiver 6 which in turn feeds the lowpass cleanup filter 7. The output of lowpass clean up filter 7 feeds the high Q synchronous bandpass filter 8. The output of the bandpass filter 8 feeds the negative slope zero crossing detector 9. The output signal from the negative slope zero crossing detector 9 feeds the adjustable delay line 10. The output of the adjustable delay line 10 feeds the vector display unit 11. One embodiment of the display is disclosed in co-pending application Ser. No. 09/948,520 filed Sep. 7, 2001, filed concurrently herewith. The master clock generator 13 feeds the signal sensor selector switch 5, the lowpass cleanup filter 7, the high Q bandpass filter 8, and the vector display unit 11, supplying a full synchronized clock signal to the system and reference clock to the vector display unit 11.

The RF signal radiated by the underground metal or pipe is picked up by the signal sensor array 4. The FM receiver 6, receives, amplifies, and detects the incoming Doppler modulated RF signal from the signal sensor selector switch 5. The pulse output from the FM receiver 6 is fed into the lowpass filter 7 which removes all extraneous signals and noise and passes only the Doppler signal created at the signal sensor array 4. This signal is then fed to a high Q tracking bandpass filter 8. The output of the high Q tracking bandpass filter 8 is fed into the input of a negative slope zero crossing detector 9. The negative slope zero crossing detector 9 generates strobe signals at the negative slope zero crossings of the Doppler signal. Inherent time delays in the system require that the output of the negative slope zero crossing detector 9 be fed into an adjustable delay line 10 which adjusts display light activation as necessary. The output of the delay line 10 is positional data signal for the vector display 11. The master clock 13 provides synchronizing signals for all the sub-systems and the reference signal for the vector display unit 11. The data strobe 12 signal from the adjustable delay line 10 and the reference signal from the master clock, supply the frequency difference information for the vector display unit 11 to convert Doppler frequency shift into a vector positional display.

Figure 3:
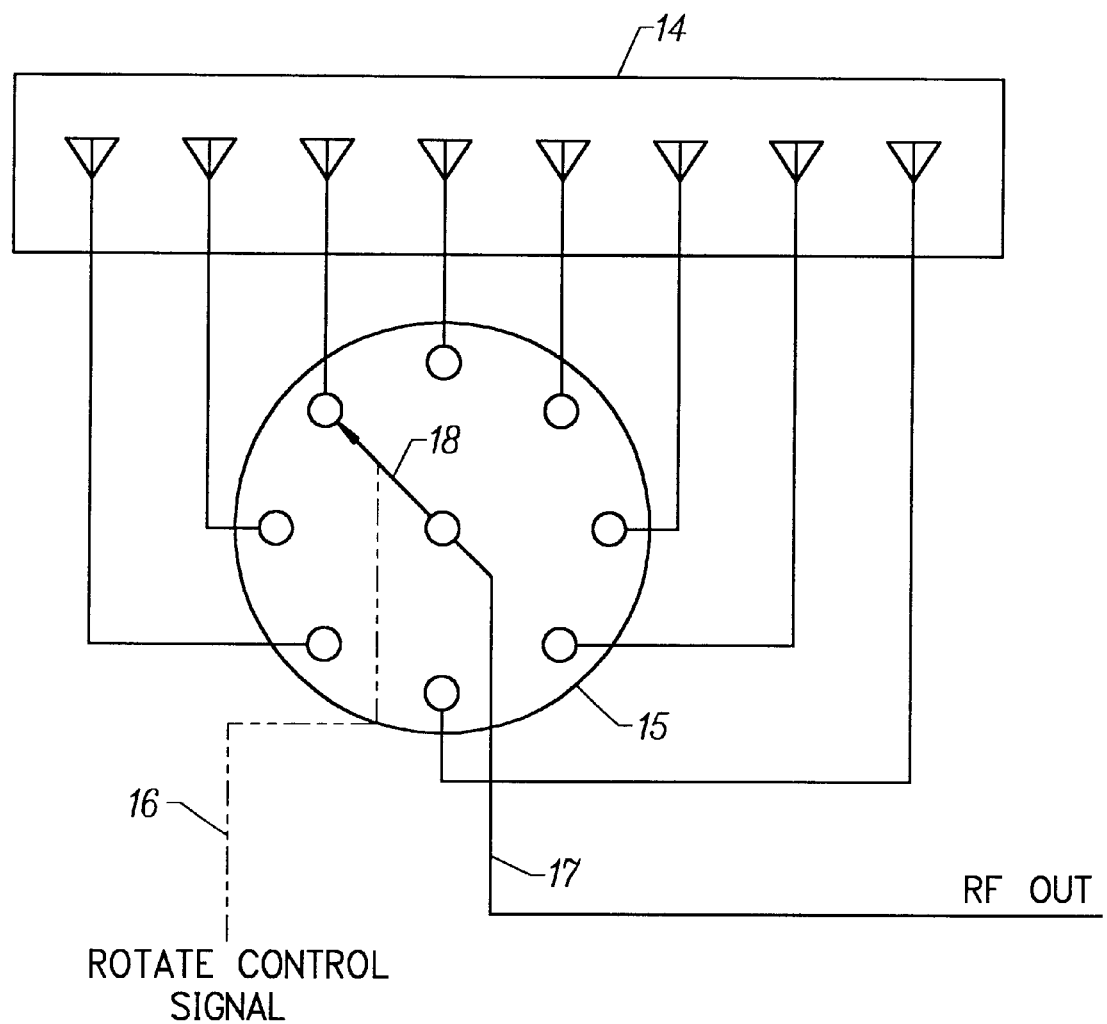
FIG. 3 is a block diagram of the signal sensor selector switch for 8 sensor elements.

FIG. 3 illustrates how an eight signal sensor array 14 selector switch 15 functions. Each sensor of the signal sensor array 14 feeds one input of the signal sensor selector switch 15. The commutator of the signal sensor selector switch 15 is the RF output 17 of the signal sensor selector switch 15. The commutator of the signal sensor selector switch 15 is fed by the rotational control'signal 16. The eight element signal sensor array 14 is formed in a circle of eight individual sensors in a plane. The action of the rotational control signal 16, simulates one single sensor being physically rotated on a motorized disk.

Figure 4:
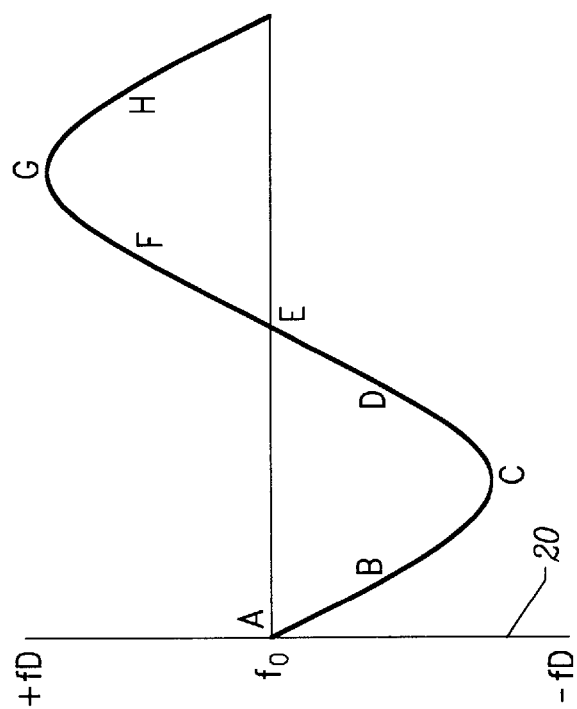
FIG. 4 is a comparison of all the signal sensor switch positions versus Doppler shift.
Figure 4:
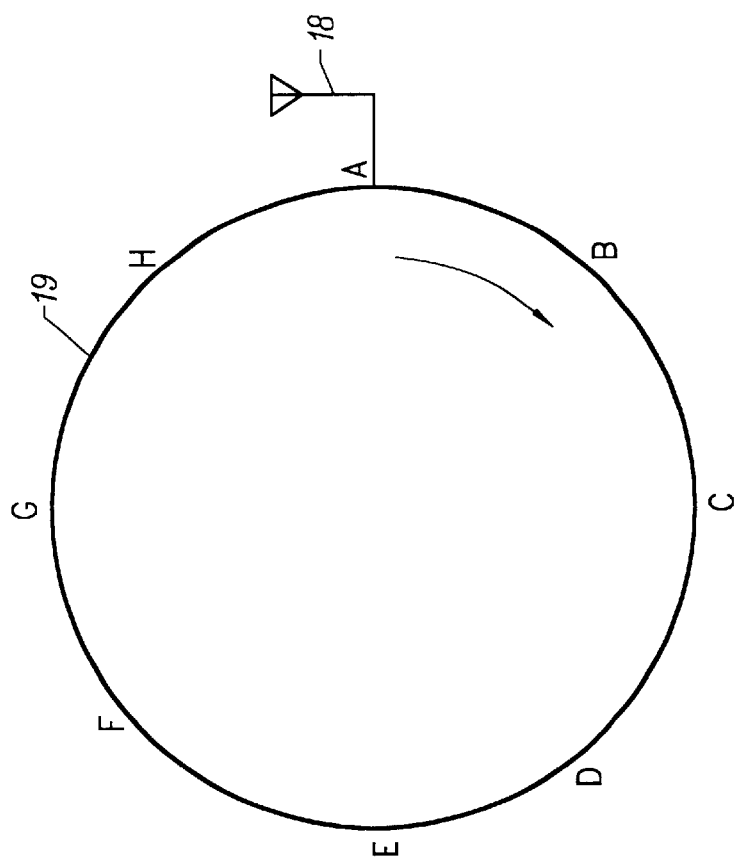

FIG. 4 illustrates the Doppler signal 20 at the output of the signal sensor array selector switch 19 as it rotates. Each sensor element 18 is marked with an alphabet character A through H. With an incoming unmodulated RF signal from one direction, the output from the FM receiver 6 of FIG. 2 is shown in the graph 20. This output is the shift in the carrier frequency created at the signal sensor array 19 from the rotational action of the signal sensor selector switch 5 of FIG. 2. The frequency shift is caused by the Doppler effect of the different distances of each sensor element from the RF source. This shift is FM and therefore easily demodulated by the FM receiver 6 of FIG. 2.

Figure 5:
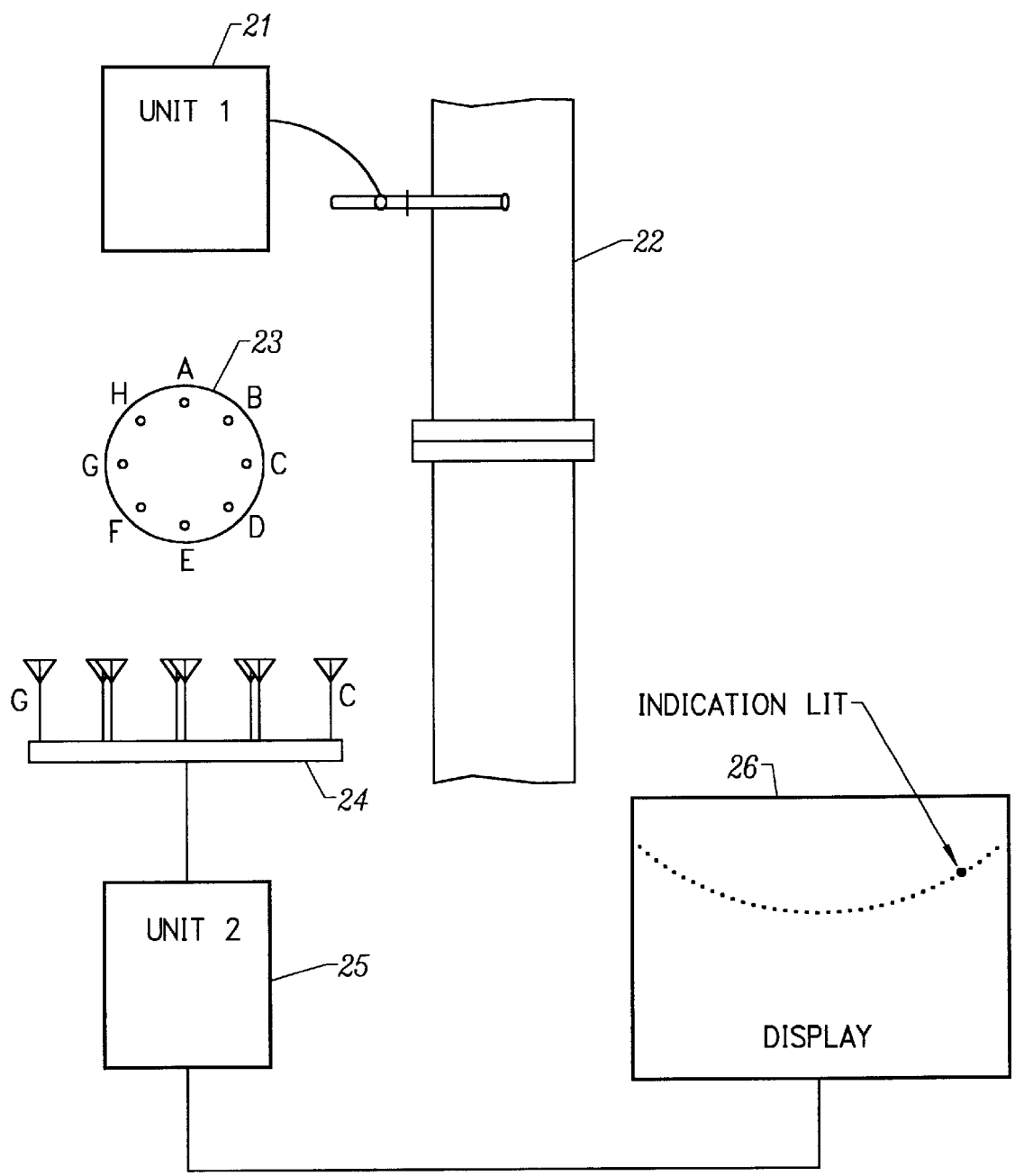
FIG. 5 is a visual representation of the vector display system with the signal sensor array to the left of the target pipe.
Figure 6:
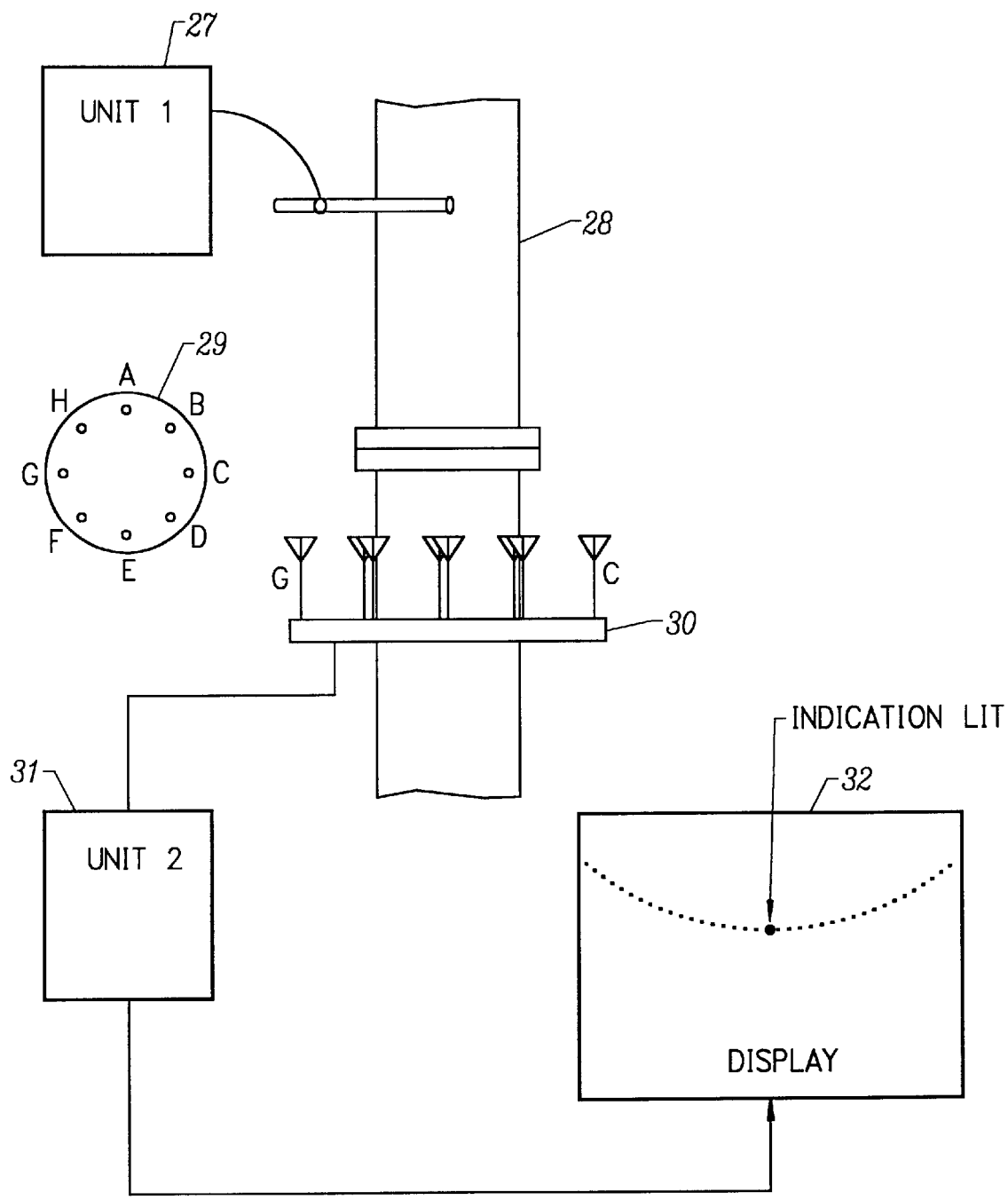
FIG. 6 is a visual representation of the vector display system with the signal sensor array directly over the target pipe.
Figure 7:
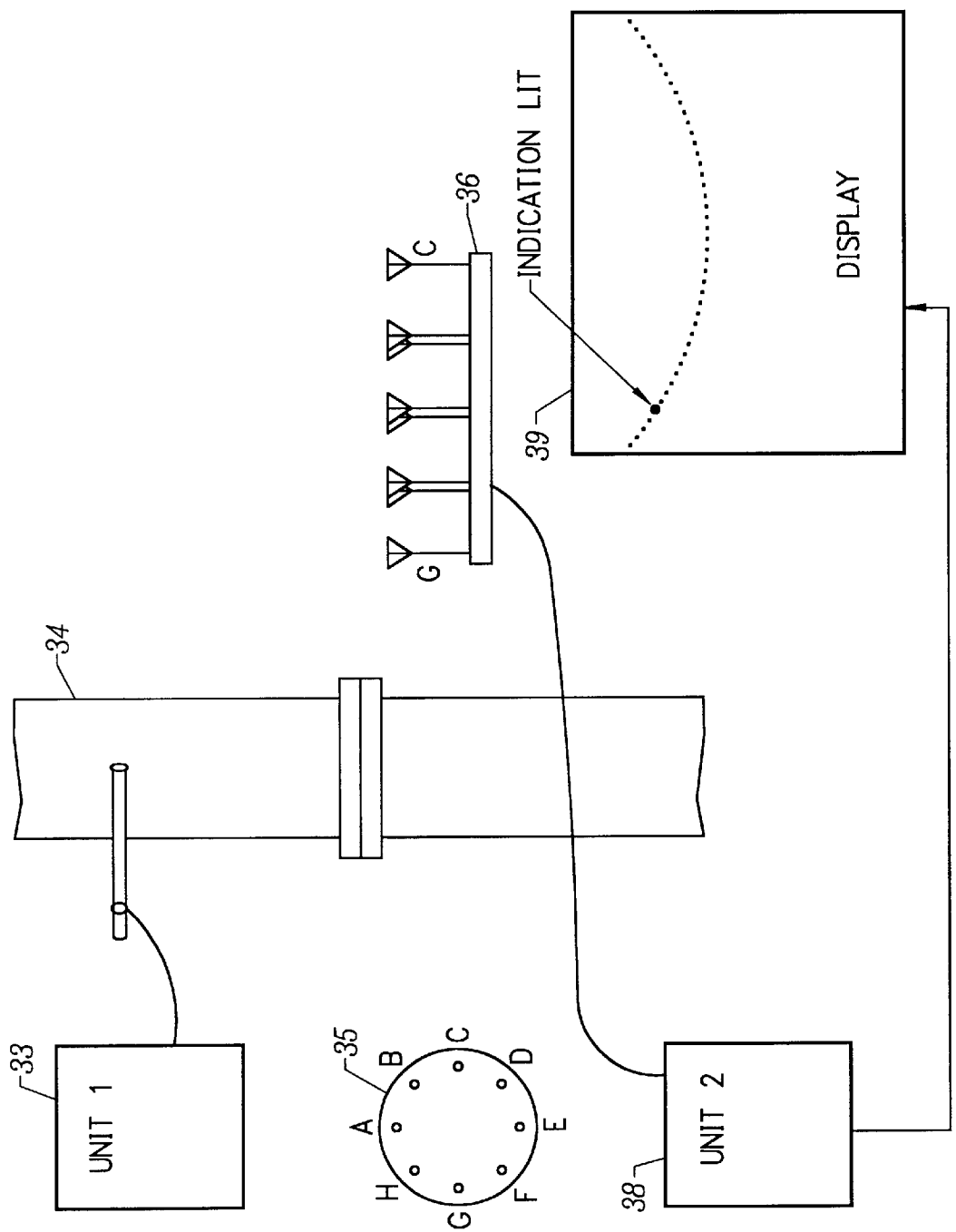
FIG. 7 is a visual representation of the vector display system with the signal sensor array to the right of the target pipe.
Figure 8:
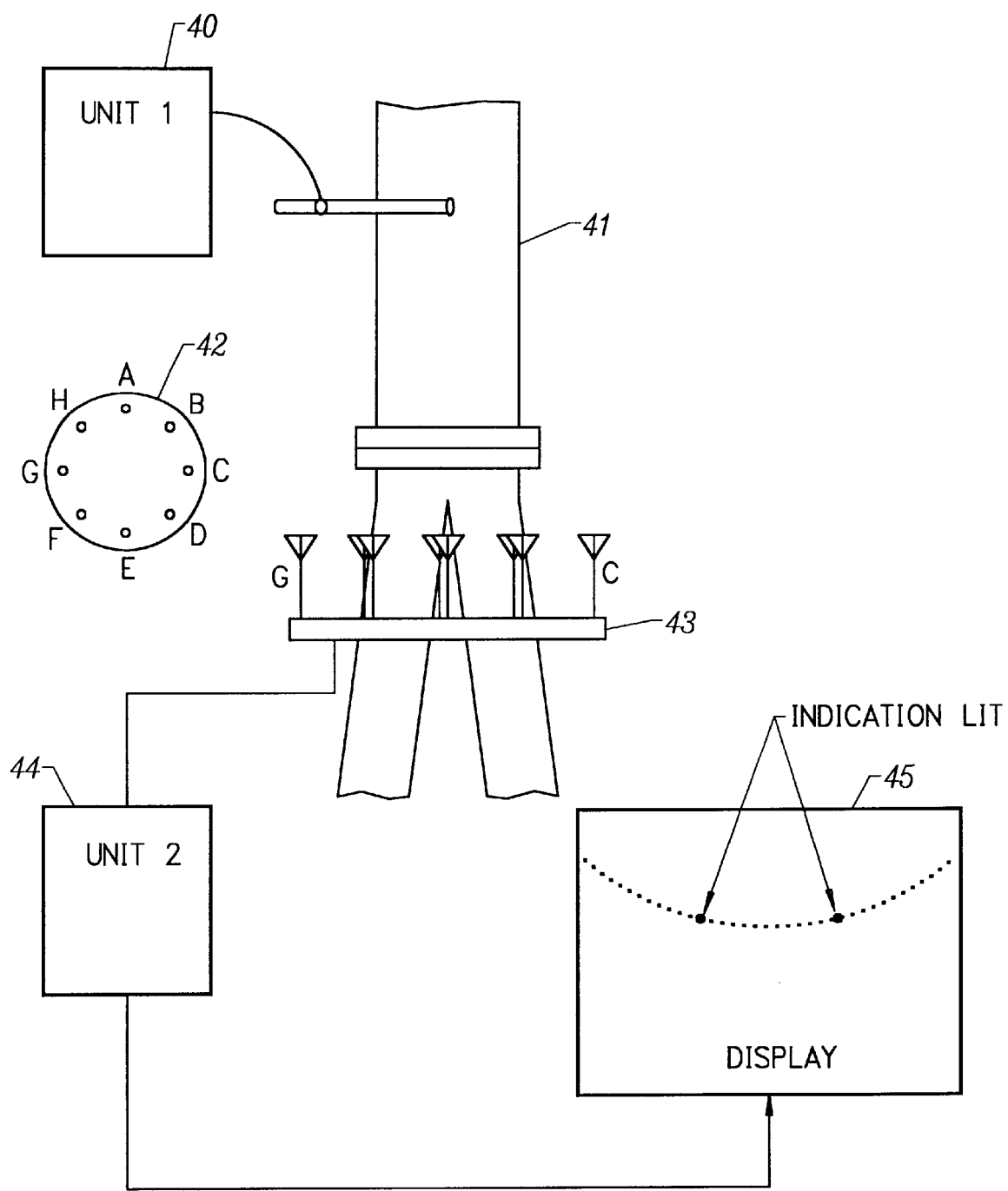
FIG. 8 is a visual representation of the vector display system with the signal sensor array directly over two branch target pipe.

FIG. 5 illustrates the expected reading detected on unit two 25 and displayed on the vector display unit 26 when the signal sensor array 24, with an actual physical orientation 23, is to the left of the unit one 21 driven target pipe 22. FIG. 6 illustrates the expected reading detected on unit two 31 and displayed on the vector display unit 32 when the signal sensor array 30, with an actual physical orientation 29, is centered over the unit one 27 driven target pipe 28. FIG. 7 illustrates the expected reading detected on unit two 38 and displayed on the vector display unit 39 when signal sensor array 36, with an actual physical orientation 35, is to the right of the unit one 33 driven target pipe 34. FIG. 8 illustrates the expected reading detected on unit two 44 and displayed on the vector display unit 45 when signal sensor array 43, with an actual physical orientation 42, is over two branches of the unit one 40 driven target pipe 41.

The invention has been implemented using transmission frequencies in the VHF band (151 $MH_3$ and in the VHF band (433 $MH_3$) with a commutation speed of approximately 4,000 rpm. Pipes at depths of 6–10 feet could be tracked with the detector being within 15 feet (horizontally) of the pipe and with transmitter power up to 5 watts.

While the invention has been described with reference to specific embodiments, the description is illustrative of the invention and is not to be construed as limiting the invention. Various modifications and applications will occur to those skilled in the art without departing from the true spirit and scope of the invention as defined by the appended claims.

What is claimed is:

1. A system for locating underground metal and pipe objects comprising:

a) a transmitter for generating a RF signal, b) first connection apparatus for applying the RF signal to the underground object, c) an above ground antenna array of antenna elements for receiving RF signals transmitted by the underground object, d) a commutator for periodically and sequentially receiving signals from each antenna element in the array, the commutator frequency modulating the received signal, e) a frequency modulation detector for demodulating the signal from the commutator and providing a Doppler effect frequency shift in the transmitted signal due to the commutator, f) a vector positional display for indicating position of the object based on Doppler effect frequency shift of the demodulated signal relative to a reference signal, g) second connection apparatus for coupling the demodulated signal and the reference signal to the display, and h) a reference clock for providing the reference signal to the display.

2. The system as defined by claim 1, wherein the RF signal has a frequency selected from 10 kilohertz to 1 gigahertz.

3. The system as defined by claim 2, wherein the second connection apparatus comprises a filter, a zero crossing detector, and an adjustable delay line.

4. The system as defined by claim 3, wherein the filter includes a lowpass filter serially connected with a high Q bandpass filter.

5. The system as defined by claim 4, wherein the first connection apparatus comprises an RF amplifier serially connected with an impedance matching network.

6. The system as defined by claim 5, wherein the reference clock provides synchronizing clock signals to the commutator, filter, and display.

7. The system as defined by claim 1, wherein the reference clock provides synchronizing clock signals to the commutator, second connection apparatus, and display.

8. The system as defined by claim 1, wherein the first connection apparatus comprises an RF amplifier serially connected with an impedance matching network.

9. The system as defined by claim 1, wherein the second connection apparatus comprises a filter, a zero crossing detector, and an adjustable delay line.

10. The system as defined by claim 9, wherein the filter includes a lowpass filter serially connected with a high Q bandpass filter.

11. A pipe locating system comprising:

a) a radio frequency signal generator, b) a coupler for coupling a signal from the generator to a pipe thereby driving the pipe as a low loss transmission line radiator, c) a detector for receiving the radiated signal including a multiple element sensor array and an actuator for sequentially selecting the multiple elements to thereby frequency modulate the received signal, d) a FM demodulator for demodulating the frequency modulated signal, e) a zero crossing detector for detecting zero crossings of the demodulated signal, f) a master clock for providing a reference clock signal, and g) a display responsive to the zero crossings of the demodulated signal and the reference clock signal for indicating location of the pipe.

12. The system as defined by claim 11 wherein the multiple elements of the sensor array are arranged in a circular array.

13. The system as defined by claim 12 wherein the demodulated signal is applied through a filter to the zero crossing detector.

14. The system as defined by claim 13 wherein the filter includes a low pass filter and a bandpass filter.

15. The system as defined by claim 14 and further including an adjustable delay line connecting the zero crossing detector to the display.

* * * * *